United States Patent
Alsop et al.

(10) Patent No.: US 6,875,838 B2
(45) Date of Patent: Apr. 5, 2005

(54) PROCESS FOR REDUCING CAPROLACTAM AND ITS OLIGOMERS IN NYLON-6 PRE-POLYMER

(75) Inventors: Albert W. Alsop, Wilimington, DE (US); Carl E. Camp, Wilimington, DE (US); John M. Iwasyk, Westgate Farms, DE (US); Dilip Rajagopalan, Newtown Square, PA (US)

(73) Assignee: Invista North Americal S.a.r.l., Wilmington, DE (US)

( * ) Notice: Subject to any disclaimer, the term of this patent is extended or adjusted under 35 U.S.C. 154(b) by 92 days.

(21) Appl. No.: 10/424,696

(22) Filed: Apr. 28, 2003

(65) Prior Publication Data

US 2004/0214982 A1 Oct. 28, 2004

(51) Int. Cl.$^7$ .................. C08G 69/04; C08G 69/08; C08G 69/16; C08J 3/00; C08F 6/00
(52) U.S. Cl. .............. 528/310; 528/312; 528/322; 528/323; 528/326; 528/480; 528/499; 528/502 C
(58) Field of Search ................. 528/310, 312, 528/322, 323, 326, 480, 499, 502 C

(56) References Cited

U.S. PATENT DOCUMENTS

| | | | |
|---|---|---|---|
| 2,245,129 A | | 6/1941 | Greenewalt |
| 5,543,495 A | | 8/1996 | Anolick et al. |
| 6,069,228 A | | 5/2000 | Alsop et al. |
| 6,201,096 B1 | * | 3/2001 | Marchildon et al. ........ 528/310 |
| 6,358,373 B1 | * | 3/2002 | Leemann et al. ............. 203/29 |
| 6,362,307 B1 | * | 3/2002 | Mohrschladt et al. ....... 528/310 |
| 6,437,089 B1 | * | 8/2002 | Cohen et al. ............... 528/310 |
| 6,525,167 B1 | | 2/2003 | Mohrschladt et al. |

FOREIGN PATENT DOCUMENTS

WO    WO 01/74925 A1    10/2001

* cited by examiner

Primary Examiner—P. Hampton Hightower

(57) ABSTRACT

Disclosed is a process for reducing low molecular weight impurities, namely caprolactam and its oligomers, from Nylon-6 pre-polymer during the preparation of Nylon-6 polymer.

5 Claims, No Drawings

US 6,875,838 B2

PROCESS FOR REDUCING CAPROLACTAM AND ITS OLIGOMERS IN NYLON-6 PRE-POLYMER

FIELD OF THE INVENTION

The present invention concerns a process for the preparation of polyamides. More specifically, the invention relates to a process for the removal of low molecular weight impurities, particularly caprolactam and cyclic dimer, of caprolactam from nylon-6 pre-polymer during the preparation of Nylon-6 polymer.

BACKGROUND OF THE INVENTION

Polyamides are conventionally prepared by the condensation polymerization of a diacid, such as adipic acid, and a diamine, such as hexamethylene diamine, or by the polymerization of lactams, such as ε-caprolactam. Other processes are known which involve preparation of polyamides by reaction of ω-aminonitriles with water. U.S. Pat. No. 2,245,129 discloses preparation of polyamides by heating ω-aminonitriles in the presence of water. U.S. Pat. No. 6,069,228 describes a method for producing polyamide polymers via pre-polymer formation.

Polyamide pre-polymers produced from ε-caprolactam or ω-aminocapronitrile contain a significant amount of caprolactam and its oligomers as impurity. As used herein the term "pre-polymer" refers to polymeric material that is used to produce Nylon-6. The amount of caprolactam and its oligomers must be reduced in the pre-polymer in order to make a polymer of adequate quality for commercial applications. It has been reported that volatile impurities content might be reduced by evaporation at sub-atmospheric pressure and at elevated temperature (see WO 2001074925 A1, EP 989150 A1).

Nylon-6 pre-polymer can be obtained by heating caprolactam and water. When this process is employed the Nylon-6 pre-polymer typically contains about 8% (wt) caprolactam, and about 1% (wt) caprolactam dimer. It is commercially desirable for the nylon-6 pre-polymer to contain less than 1% (wt) of caprolactam and less than 0.1% cyclic dimer of caprolactam.

A commercially practiced process to reduce the content of caprolactam and its oligomers in the nylon 6 pre-polymer involves extraction by water. The technique effectively reduces the content of caprolactam and its oligomers, however, it requires a long residence time. The typical commercial water extraction step takes about 24 hours and uses hot water (about 100° C.).

For cost reasons, it would be advantageous for a commercial process to reduce the residence time of the water extraction step and/or use lower temperature water.

The present invention provides for a process that involves a relatively short duration water extraction to achieve the desired purity of nylon 6 pre-polymer.

U.S. Pat. No. 6,525,167 discloses a process for producing polyamides having a reduced extractables content. The process described therein employs a first pressure drop of at least 10 bar, and a second pressure drop of at least 20 bar. Among other things, the referenced patent does not disclose how to obtain low molecular impurity in Nylon pre-polymer achieved by a smaller pressure drop followed by water extraction.

SUMMARY OF THE INVENTION

Disclosed herein is a process for removing caprolactam and its oligomers from a pre-polymer mixture comprising caprolactam, oligomers of caprolactam, and nylon-6 pre-polymer, said process comprising: (a) subjecting the pre-polymer mixture in a molten state to a sudden pressure drop discharge; b) contacting the discharged pre-polymer mixture from step (a) with water to produce a pre-polymer phase and a water phase and for a time sufficient for at least a portion of the caprolactam and oligomers to be extracted into the water phase, and (c) separating the pre-polymer phase from the water phase.

DETAILED DESCRIPTION OF THE INVENTION

The present invention discloses a process for the preparation of Nylon-6 pre-polymer wherein the a relatively short duration of water contact is needed to extract the pre-polymer and wherein the pre-polymer obtained comprises 1 wt % or less caprolactam and/or 0.1 wt. % or less of cyclic dimer of caprolactam.

In the process of the present invention, Nylon-6 pre-polymer melt is first maintained at a pressure of about 250 psi (1724 kPa), and is then subjected to a sudden pressure drop of at least 50 psi (345 kPa). The pressure drop may be accomplished across a nozzle. Alternatively, where the process for preparing the pre-polymer is at atmospheric pressure, then it will be necessary to re-pressurize to achieve the 50 psi pressure drop. If the system is already at or above 50 psig, then re-pressurization is not required. The pre-polymer melt is then discharged through into water. This may be accomplished by discharging the pre-polymer melt through die holes. Typical die holes have are about 0.25 in diameter. Upon contact with water, the pre-polymer is solidified. This step allows extraction of low molecular weight materials such as caprolactam and the cyclic dimer of caprolactam. Agitation of the mixture of water and nylon 6 pre-polymer is preferred. Typical contact time of the pre-polymer with the water is from about 5 minutes to about 60 minutes.

In the process of the present invention, the discharged polymer is contacted with the water for a time, but generally does not exceed about 1 hour. Preferably, the discharged polymer is contacted with the water for a time of about 5 minutes. The water temperature is from about 10° C. to about 50° C. It is preferable that the temperature of water is from about 15 to about 25° C.

In another embodiment of the invention, the nylon-6 pre-polymer is solidified prior to contacting with water. One can accomplish solidifying the pre-polymer by allowing the polymer to cool. Cooling may be accomplished by using air, nitrogen, or other medium, which would allow the pre-polymer to solidify. The solid phase comprising nylon 6 pre-polymer is then separated from the aqueous phase. The following non-limiting examples demonstrate the invention.

EXAMPLES

Example 1

Pressure Drop to Solidify Caprolactam Pre-Polymer 27.8 gm of 6.2 RV (relative viscosity) Nylon-6 pre-polymer containing 6.8 wt % caprolactam and 0.7 wt % cyclic dimer was charged to a reactor along with 2.2 gm water and 0.3 gm nitrogen. The mixture was heated to 240° C., mixed, and forced through a 0.0762 cm diameter hole with 600 psi upstream pressure. The resulting Nylon-6 powder had an RV of 4.4, a caprolactam content of 9.8 wt % and cyclic dimer content of 0.8 wt %. This powder was contacted with cold water (20° C.) for 15 s in a beaker. The contents of the beaker were filtered to separate the powder from the water resulting in an additional contact time of the powder and water of approximately 30 s. Through this process, the caprolactam content of the powder was reduced to 1.8 wt % and the cyclic dimer content to 0.2 wt %. The pressure drop was 600 psig. This example demonstrates that a pressure drop alone did not result in significant reduction of extractables. The process required subsequent contact with water to result in reduction of extractable impurities.

Example 2

Pressure Drop, Repressurization, Followed by Contact with Water to Soldify Caprolactam Pre-Polymer A 75 wt % solution of caprolactam in water was heated in an autoclave to 272° C. and held at 250 psig pressure for 2 hours. While holding the temperature constant, the pressure was then reduced to atmospheric in 15 minutes, followed by repressurization to 50 psig with Nitrogen and a 30 minute hold. Finally, the product was rapidly discharged through 2 holes of 0.635 cm diameter in the form of a continuous strand which was collected in a large drum of cold water. After 5 minutes contact with water, the product was removed and analyzed to have an RV of 18, and caprolactam and cyclic dimer levels of 3.6 and 0.4 wt %, respectively.

Example 3

Pressure Drop Applied to Aminocapronitrile Pre-Polymer, Followed by Contact with Water 25 lb 6-aminocapronitrile and 10 lb water were charged to an autoclave and heated to 260° C. At this stage, water injection was commenced at 100 cc/min, and heating continued to 275° C. Pressure relief was set to 600 psig, and water injection was maintained for 3 hours. Pressure was then reduced to 50 psig over a 90 minute period while the temperature was simultaneously dropped to 260° C. After the pressure reduction, the product was discharged through 2 holes of 0.635 cm diameter in the form of a spray into a large drum of cold water. After 2 minutes of contact, product was removed and analyzed. The polymer RV was 7.9, and its caprolactam and cyclic dimer content was 2.0 wt % and 0.61 wt %, respectively.

What is claimed is:

1. A process for removing caprolactam and its oligomers from a pre-polymer mixture comprising caprolactam, oligomers of caprolactam, and nylon-6 pre-polymer, said process comprising:

(a) subjecting the pre-polymer mixture in a molten state to a sudden pressure drop discharge;

(b) contacting the discharged pre-polymer mixture from step (a) with water to produce a pre-polymer phase and a water phase for a time sufficient for at least a portion of caprolactam and oligomers of caprolactam to be extracted into the water phase, wherein the temperature of the water used is from about 10° C. to about 50° C.; and (c) separating the pre-polymer phase from the water phase.

2. The process of claim 1, wherein the pre-polymer discharge from step (a) is allowed to solidify prior to contacting the water in step (b).

3. The process of claim 2, wherein the time that the solidified pre-polymer mixture is in contact with the water does not exceed about 60 minutes.

4. The process of claim 1, wherein the pressure drop in step (a) is at least about 50 psi.

5. The process of claim 1, wherein the pressure drop discharge in step (a) is accomplished through a nozzle.

* * * * *